United States Patent [19]

Gehrke

[11] Patent Number: 5,525,114
[45] Date of Patent: Jun. 11, 1996

[54] RESILIENTLY BIASED ENDLESS DRIVEN SPROCKET CHAIN

[76] Inventor: Duane K. Gehrke, 802 W. Dahlia Dr., Phoenix, Ariz. 85029

[21] Appl. No.: 322,319

[22] Filed: Oct. 13, 1994

[51] Int. Cl.⁶ ............................................. F16G 13/08
[52] U.S. Cl. ............................ 474/207; 37/190; 37/465
[58] Field of Search .......................... 474/94, 206, 207, 474/155, 156, 231; 37/190, 465

[56] References Cited

U.S. PATENT DOCUMENTS

| | | | |
|---|---|---|---|
| 447,813 | 3/1891 | Elliott | 474/207 X |
| 1,740,607 | 12/1929 | Leary. | |
| 1,896,711 | 2/1933 | Lichtenberg | 474/207 X |
| 1,956,472 | 4/1934 | Penn | 474/207 X |
| 1,970,568 | 8/1934 | Knox | 474/207 X |
| 1,983,548 | 12/1934 | Knox et al. | 474/207 X |
| 2,491,974 | 12/1949 | Hansen | 74/243 |
| 2,637,917 | 5/1953 | Klaucke | 37/191 |
| 2,842,873 | 7/1958 | George et al. | 37/86 |
| 2,987,332 | 6/1961 | Bonmartini | 474/207 X |
| 3,104,481 | 9/1963 | George et al. | 37/191 |
| 4,523,674 | 6/1985 | Haugen et al. | 198/843 |
| 5,127,884 | 7/1992 | Seymour | 474/155 |
| 5,284,457 | 2/1994 | Gerstenberger et al. | 474/95 |

*Primary Examiner*—Roger Schoeppel
*Attorney, Agent, or Firm*—Lowell W. Gresham; Jordan M. Meschkow

[57] ABSTRACT

An endless driven sprocket chain (10) includes inner links (24) which couple to outer links (26) through a resilient bushing (50). A pin (42) having a shaft (44) with a hexagonal cross sectional shape mates with a corresponding hole in outer link plates (32, 34). The shaft (44) also mates with a hexagonal cross sectional shaped hole in the bushing (50) through an metallic insert (56). The bushing is pressed into a metallic sleeve (58) which in turn is press fit into inner link plates (28, 30) at holes (36) therein. The hexagonal alignment of the holes (40) in the outer link plates (32, 34) with the corresponding hole (54) in bushing 50 defines a resting position where the inner links (24) reside at an oblique angle to the outer links (26). When the inner links (24) form a substantially straight line with the outer links (26) the bushing is deformed and imposes a force of the links (24, 26) that urges the links (24, 26) toward the resting position.

17 Claims, 3 Drawing Sheets

5,525,114

RESILIENTLY BIASED ENDLESS DRIVEN SPROCKET CHAIN

TECHNICAL FIELD OF THE INVENTION

The present invention relates generally to endless driven sprocket chains. More specifically, the present invention relates to endless driven sprocket chains which include resilient biasing members between chain links.

BACKGROUND OF THE INVENTION

Endless driven sprocket chains are commonly used in many different types of machinery. Such chains form an endless loop using a multiplicity of interleaved inner and outer chain links. Inner chain links couple to outer chain links using a pivot pin or the equivalent to allow individual inner links to rotate relative to outer links about pivot points. Driving sprockets and the like engage the chains, typically at their inner links, to impart motion to the chains. Driven sprockets, idler gears, and the like may receive rotational motion as the chains move. As the chains' movement causes the chains to curve around sprockets, inner and/or outer chain links pivot around the pivot pins so that the chains' shape conforms to the shape of the sprockets. Examples of such chains include bicycle chains, motorcycle chains, chain saw blades, and trench digger blades.

Conventional endless driven sprocket chains allow inner links to freely pivot about the pivot pins, at least for the range of motion experienced by the chains in normal operation. This unrestrained pivoting leads to several undesirable consequences. For example, chain tensioning mechanisms are often needed to maintain a proper amount of chain tension. Such chain tensioning mechanisms are usually considered to be relatively expensive, unreliable, and complex. If chain tension mechanisms are omitted, then chains often operate in either a too loose or too tight condition, and both conditions lead to excessive wear and tear.

In addition, an excessive amount of driving force is expended in causing a conventional chain to rotate around sprockets, and this limits chain speed and overall efficiency. This factor is particularly troublesome when the chain tends to experience a load or impacts at the point where the chain changes directions, such as occurs with trench digging chains. In such conditions, conventional chains typically operate in a highly tightened state, which leads to driving inefficiencies.

SUMMARY OF THE INVENTION

Accordingly, it is an advantage of the present invention that an improved resiliently biased endless driven sprocket chain is provided.

Another advantage of the present invention is that a resiliently biased endless driven sprocket chain is provided that limits wear and tear experienced by impact loads.

Another advantage is that the present invention provides a resilient biased endless driven sprocket chain that improves driving efficiency and chain speed.

The above and other advantages of the present invention are carried out in one form by an endless driven sprocket chain that demonstrates efficient rotation and impact resistance. The chain includes an inner link, an outer link, and a pin. The pin is configured in cooperation with a first one of the inner and outer links to restrain relative rotational motion between the pin and the first link. Resilient biasing means are included for permitting relative rotation between the pin and a second one of the inner and outer links and for urging relative rotation between the pin and the second link toward a resting position.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
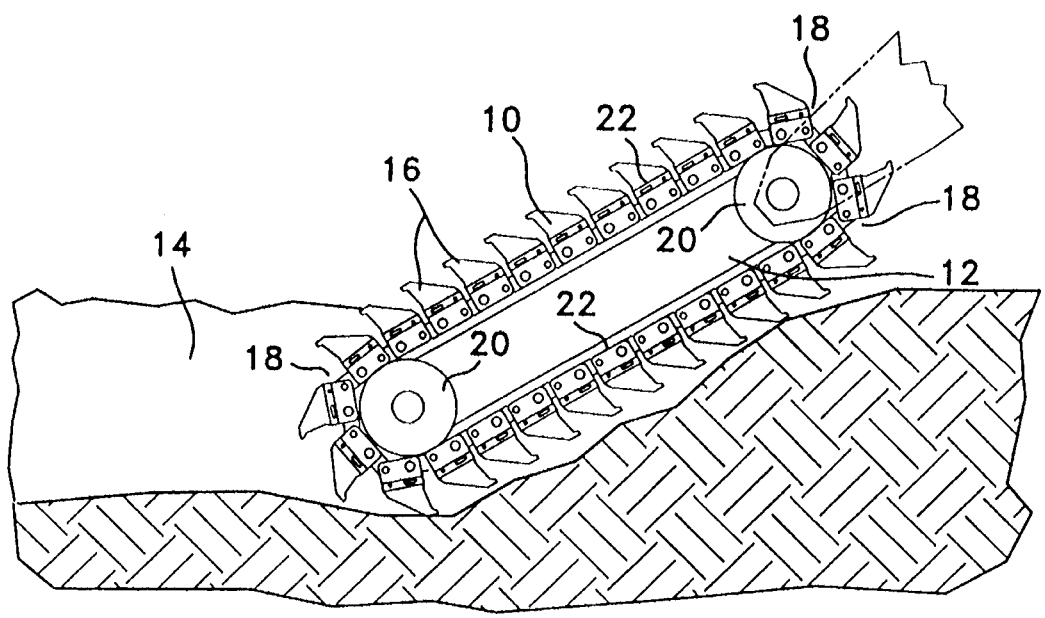
FIG. 1 shows a trench digging chain mounted on a boom around which the chain rotates to dig a trench.

FIG. 1 shows a trench digging chain 10 mounted on a boom 12 around which chain 10 rotates in order to dig a trench 14. Chain 10 includes a multiplicity of inner and outer links (discussed below) which couple together to permit a limited amount of rotation therebetween. Trench digging blades 16 attach to the links and project outward from chain 10. The inner and outer links couple together through resilient members (discussed below) which deform when inner and outer links rotate away from a resting position. At points 18 where chain 10 curves around a sprocket 20 and the inner and outer links are at an oblique angle to one another, the resilient members are at their undeformed, resting position. However, in regions 22 where the inner and outer links generally form a straight line, the resilient members are deformed. When resilient members are deformed, they impart a force to the corresponding inner and outer links which urges the links toward the resting position.

A driving force, not shown, imparts energy and rotational motion to chain 10. A portion of the energy used to impart the rotational motion is consumed in deforming the resilient members as chain 10 straightens out or otherwise transitions from points 18 to regions 22. On the other hand, energy stored in the resilient members is released as kinetic energy aids rotational motion as chain 10 transitions from a region 22 toward points 18. The release of energy occurs at the points where chain 10 often encounters a load or impact. In addition, the use of resilient members tends to maintain a constant tension in chain 10, and chain 10 may be operated in a generally loosened state compared to chains which do not incorporate resilient members. The internal tensioning tendency of chain 10 allows chain tensioners to be omitted in some applications and simplified in others. The operation in a loosened state reduces wear and tear upon the chain 10, boom 12, sprockets 20, and other components (not shown). Moreover, the use of resilient members allows impact energy to be temporarily absorbed in the resilient members rather than transmitted through boom 12, sprockets 20, and the like. This further reduces wear and tear.

Figure 2:
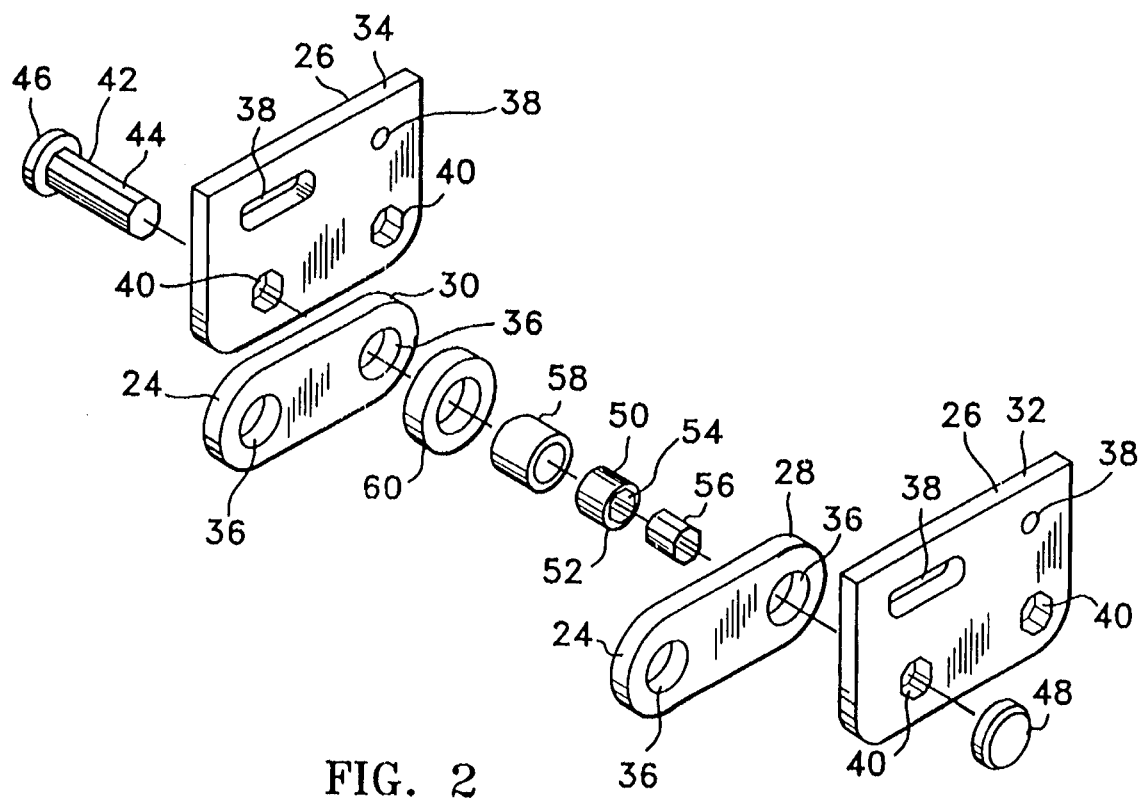
FIG. 2 shows an exploded view of components used to couple inner and outer chain links together.
Figure 3:
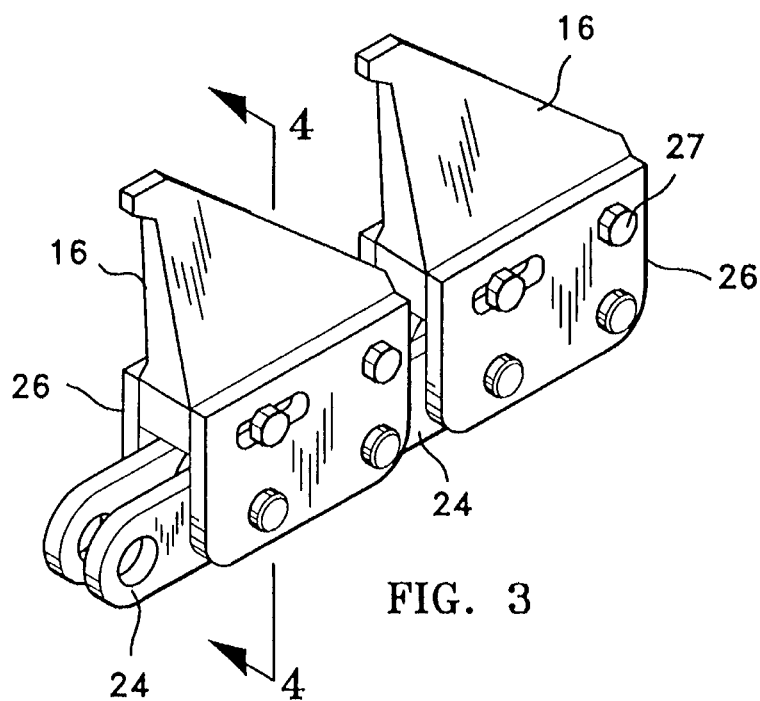
FIG. 3 shows a perspective view of two sets of inner and outer links from the chain in a position where substantially no angle exists between the inner and outer links.

FIG. 2 shows an exploded view of components used to couple an inner link 24 to an outer link 26 in chain 10. While FIG. 2 shows only one set of links, those skilled in the art will appreciate that this arrangement of components may be repeated for a multiplicity of links to form chain 10. FIG. 3 shows a perspective view of two sets of inner links 24 and outer links 26 from chain 10 in a position where substantially no angle exists between the inner and outer links 24 and 26. As discussed above, this position corresponds to region 22 (see FIG. 1), where resilient bushings 50 (see FIG. 2) are deformed from their resting positions. In addition, FIG. 3 illustrates the attachment of trench digging blades 16 to outer links 26 through bolts 27.

Figure 4:
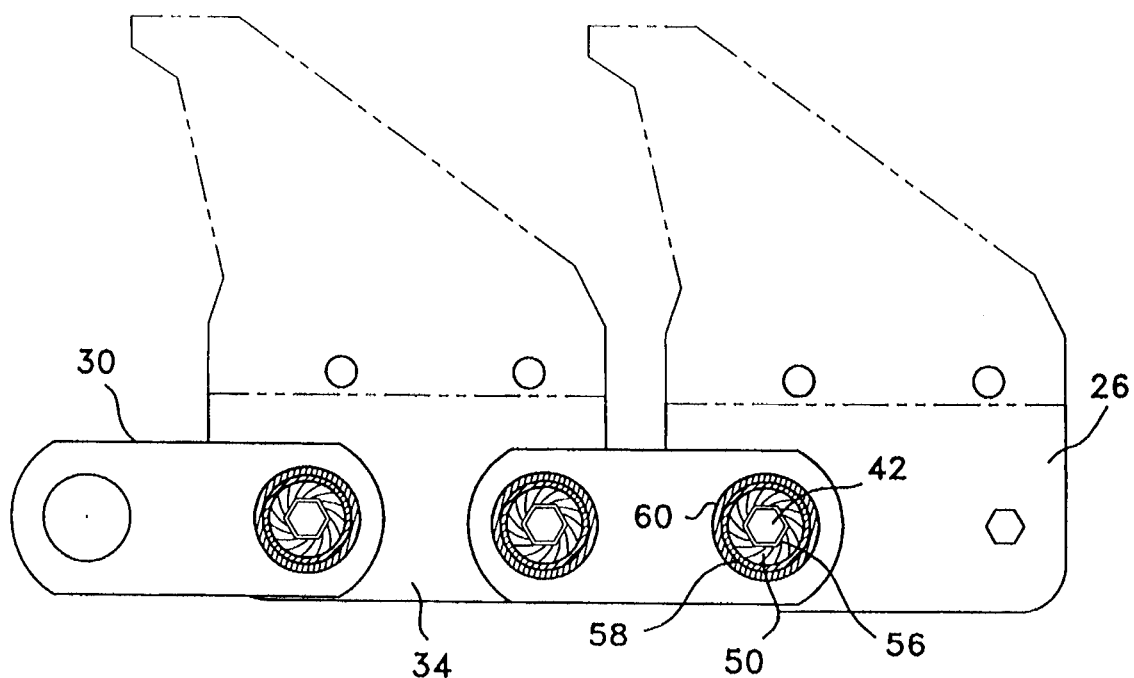
FIG. 4 shows a cross sectional side view of the two sets of inner and outer chain links in the position where substantially no angle exists between the inner and outer links.

FIG. 4 shows a corresponding cross sectional side view of inner and outer links 24 and 26 in the position they take through straight region 22 (see FIG. 1) where substantially no angle exists between inner and outer links 24 and 26.

Figure 5:
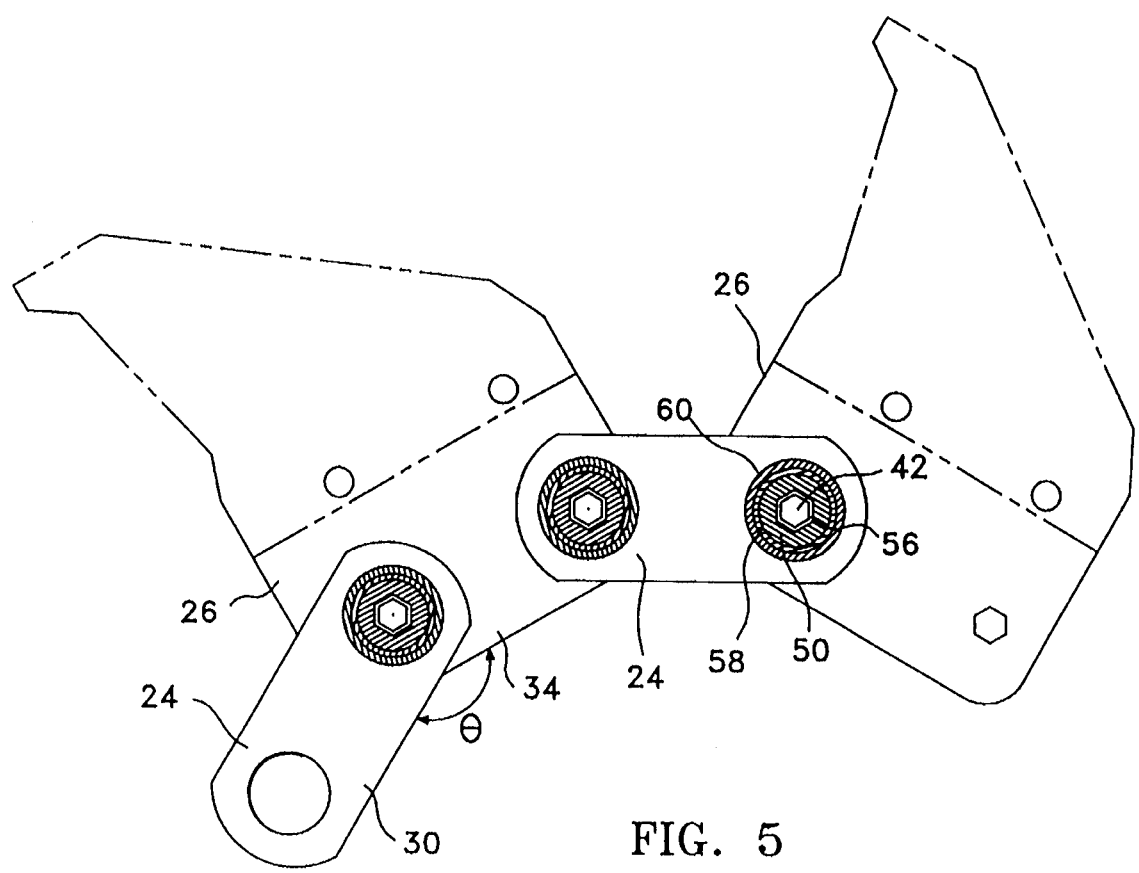
FIG. 5 shows a cross sectional side view of the two sets of inner and outer chain links in a position where the inner and outer links are at an oblique angle to each other.

FIG. 5 shows a cross sectional side view of inner and outer chain links 24 and 26 in the position they take at point 18 (see FIG. 1) where an oblique angle θ exists between inner and outer links 24 and 26. Oblique angle θ may be defined as the angle formed between the planes representing the bottom surfaces of inner link 24 and outer link 26. Those skilled in the art will appreciate that oblique angle θ may vary as chain 10 revolves around sprocket 20.

Referring to FIGS. 2–5, but primarily to FIG. 2, inner link 24 includes first and second plates 28 and 30, respectively, and outer link 26 includes first and second plates 32 and 34, respectively. Plates 28 and 30 are substantially identical to one another, and plates 32 and 34 are substantially identical to one another. Inner link plates 28 and 30 each include holes 36 proximate leading and trailing ends thereof. Outer link plates 32 and 34 each include upper holes 38 which are used to attach trenching digging blades 16 (see FIG. 1) and lower holes 40. Lower holes 40 reside proximate leading and trailing ends of plates 32 and 34.

A pin 42 having a shaft portion 44, a first head portion 46, and a second head portion 48 fits through one of holes 40 in each of outer link plates 32 and 34 and through one of holes 36 in each of inner link plates 28 and 30. Shaft 44 of pin 42 has a polygonal cross sectional shape, which is hexagonal in the preferred embodiment. Likewise, holes 40 have a similar polygonal shape and configuration so that shaft 44 may slidingly but snugly engage holes 40. The complementing cross sectional polygonal shapes of shaft 44 and holes 40 restrain relative rotation between pin 42 and outer link plates 32 and 34. Thus, any rotation of pin 42 causes outer link 26 to rotate and vice-versa.

A resilient bushing 50, which is preferably made from rubber or a similar dense resilient material, has a circular shaped outer circumferential surface 52 and a concentric hole 54. In the preferred embodiment, hole 54 has a polygonal cross sectional shape which corresponds to the cross sectional shape of shaft 44 and outer link plate holes 40. A thin metallic insert 56 resides within hole 54, is shaped to conform to the shape of polygonal hole 54, is approximately as wide (i.e. in the direction of pin 42) as bushing 50, and is permanently attached to bushing 50. Pin 42 slidingly but snugly fits through insert 56. Thus pin 42 mates with bushing 50 through insert 56 so that pin 42 cannot rotate relative to hole 54 of bushing 50. Insert 56 spreads forces imparted from pin 42 to bushing 50 throughout the entire surface area of hole 54 to prevent pin 42 from tearing up bushing 50.

Resilient bushing 50 resides within a cylindrically shaped metallic sleeve 58. The inside diameter of sleeve 58 is slightly smaller than the outside diameter of bushing 50 at outer surface 52, and the width of sleeve 58 is about the same as the width of bushing 50. Thus, bushing 50 is pressed into sleeve 58 so that no relative movement thereafter takes place between outer surface 52 of bushing 50 and sleeve 58.

Likewise, the outer diameter of sleeve 58 is slightly larger than the diameter of holes 36 in inner link plates 28 and 30. Sleeve 58, along with bushing 50 and insert 56, is pressed into inner link plates 28 and 30 at holes 36. Due to the press fit between sleeves 58 and plates 28 and 30 at holes 36, no rotational motion occurs between sleeve 58 and inner link plates 28 and 30.

The orientation of sleeve 58 relative to inner link plates 28 and 30 is controlled to accomplish the "timing" achieved by resilient bushings 50 in chain 10. Sleeve 58 is rotatably oriented relative to inner link plates 28 and 30 so that hexagonal hole 54 in bushing 50 aligns with hexagonal hole 40 in outer plates 32 and 34 when inner links 24 and outer links 26 are at the angle that defines their resting position. When inner link 24 and outer link 26 are not in their resting position, the rotation of outer surface 52 relative to shaft 44 creates torsion within bushing 50.

A steel roller 60 fits over sleeve 58 so that it may freely rotate thereon. Roller 60 resides between inner link plates 28 and 30. Thus, roller 60 is thinner in width than sleeve 58 or bushing 50, which extend for the width of roller 60 plus the widths of inner link plates 28 and 30. Sprockets 20 (see FIG. 1) engage chain 10 (see FIG. 1) at rollers 60.

Substantially all rotational motion occurring between inner link 24 and outer link 26 occurs within resilient bushing 50. Outer surface 52 of bushing 50 may rotate relative to hole 54 of bushing 50 through a range of angles. This rotation either causes bushing 50 to distort further or causes bushing 50 to approach its undistorted resting position.

In summary, the present invention provides an improved resiliently biased endless driven sprocket chain. The use of resilient bushings between inner and outer chain links reduces wear and tear experienced by impact loads and improves driving efficiency and chain speed.

The present invention has been described above with reference to preferred embodiments. However, those skilled in the art will recognize that changes and modifications may be made in these preferred embodiments without departing from the scope of the present invention. For example, those skilled in the art will appreciate that the teaching of the trench digging chain discussed herein applies equivalently to other types of endless driven sprocket chains. These and other changes and modifications which are obvious to those skilled in the art are intended to be included within the scope of the present invention.

What is claimed is:

1. An endless driven sprocket chain that demonstrates efficient rotation and impact resistance, said chain comprising:

a first link;

a second link;

a pin configured in cooperation with said second link to restrain relative rotational motion between said pin and said second link; and a resilient bushing having a hole at which said bushing immovably couples to said pin and having an outer surface which immovably couples to said first link, said bushing permitting relative rotation between said pin and said first link and said bushing urging relative rotation between said pin and said first link toward a resting position which is achieved when said first link resides at an oblique angle to said second link.

2. An endless driven sprocket chain as claimed in claim 1 wherein said resilient bushing additionally comprises a metallic insert residing within said bushing hole, said insert serving to contact said pin.

3. An endless driven sprocket chain that demonstrates efficient rotation and impact resistance, said chain comprising:

a first link;

a second link;

a pin configured in cooperation with said second link to restrain relative rotational motion between said pin and said second link; and a resilient bushing having a hole at which said bushing non-rotatably couples to said pin and having an outer surface that non-rotatably couples to said first link, said bushing permitting relative rotation between said pin and said first link and urging relative rotation between said pin and said first link toward a resting position; and a trench digging blade coupled to one of said first and second links.

4. An endless driven sprocket chain as claimed in claim 3, wherein said first link is an inner link and said second link is an outer link.

5. An endless driven sprocket chain as claimed in claim 3, wherein:

said first link represents one of a multiplicity of substantially identical first links utilized in said chain;

said second link represents one of a multiplicity of substantially identical second links utilized in said chain;

said pin represents one of a multiplicity of substantially identical pins utilized in said chain; and said bushing represents one of a multiplicity of substantially identical bushings utilized in said chain.

6. An endless driven sprocket chain as claimed in claim 3, wherein said bushing is configured so that said resting position is achieved when said first link resides at an angle to said second link.

7. An endless driven sprocket chain as claimed in claim 3, wherein said bushing is configured so that said resting position is achieved when said first link resides at an oblique angle to said second link.

8. An endless driven sprocket chain as claimed in claim 3, wherein said bushing is immovably coupled to said pin at said hole, and said outer surface is immovably coupled to said first link.

9. An endless driven sprocket chain as claimed in claim 3, wherein said bushing is comprised of rubber.

10. An endless driven sprocket chain as claimed in claim 3, additionally comprising a metallic insert residing within said hole, said insert serving to contact said pin.

11. An endless driven sprocket chain as claimed in claim 3, wherein:

said pin has a shaft portion which, in cross section, has a polygonal shape; and said second link has a polygonal opening which mates with said shaft.

12. An endless driven sprocket chain as claimed in claim 11, wherein said polygonal shape is a hexagonal shape.

13. An endless driven sprocket chain that demonstrates efficient rotation and impact resistance, said chain comprising:

a first link;

a second link;

a pin configured in cooperation with said second link to restrain relative rotational motion between said pin and said second link; and a resilient bushing having a hole at which said bushing non-rotatably couples to said pin and having an outer surface that non-rotatably couples to said first link, said bushing being configured to store potential energy when substantially no angle exists between said first link and said second link and configured to release kinetic energy to urge relative rotation between said first link and said second link when said first link and said second link approach a resting position.

14. An endless driven sprocket chain as claimed in claim 13, additionally comprising a metallic insert residing within said hole, said insert serving to contact said pin.

15. An endless driven sprocket chain as claimed in claim 13, wherein said bushing is configured so that said resting position is achieved when said first link resides at an angle to said second link.

16. An endless driven sprocket chain as claimed in claim 13, wherein said bushing is configured so that said resting position is achieved when said first link resides at an oblique angle to said second link.

17. An endless driven sprocket chain as claimed in claim 13, wherein said bushing is immovably coupled to said pin at said hole, and said outer surface is immovably coupled to said first link.

* * * * *